US011935368B2

(12) United States Patent
Rolfs et al.

(10) Patent No.: US 11,935,368 B2
(45) Date of Patent: Mar. 19, 2024

(54) LOTTERY TICKET DISPENSING METHOD AND SYSTEM WITH ADDITIONAL PURCHASE RECOMMENDATION CAPABILITY

(71) Applicant: Scientific Games International, Inc., Newark, DE (US)

(72) Inventors: Susan Emily Rolfs, Waxhaw, NC (US); Todd George Stover, Canton, GA (US); Jacob Ezra Kreider, Harrisburg, PA (US); Richard Colin DiCroce, Berkley, MA (US); Kent D. Christensen, Cumming, GA (US)

(73) Assignee: Scientific Games, LLC, Alpharetta, GA (US)

( * ) Notice: Subject to any disclaimer, the term of this patent is extended or adjusted under 35 U.S.C. 154(b) by 418 days.

(21) Appl. No.: 17/328,468

(22) Filed: May 24, 2021

(65) Prior Publication Data

US 2022/0375313 A1 Nov. 24, 2022

(51) Int. Cl.
*G07F 17/42* (2006.01)
*G07C 15/00* (2006.01)
*G07F 17/32* (2006.01)

(52) U.S. Cl.
CPC ........... *G07F 17/42* (2013.01); *G07C 15/005* (2013.01); *G07F 17/329* (2013.01)

(58) Field of Classification Search
None
See application file for complete search history.

(56) References Cited

U.S. PATENT DOCUMENTS

| | | | | |
|---|---|---|---|---|
| 7,479,060 | B2 | 1/2009 | Walker et al. | |
| 8,602,863 | B2 | 12/2013 | Walker et al. | |
| 11,276,273 | B1 * | 3/2022 | Donahue, III | G07F 17/323 |
| 2008/0020845 | A1 * | 1/2008 | Low | G07F 17/32 463/42 |
| 2013/0184071 | A1 * | 7/2013 | Gadher | G07F 17/3227 463/29 |
| 2016/0232741 | A1 | 8/2016 | Assis et al. | |
| 2017/0323526 | A1 * | 11/2017 | Boothe | G06Q 30/00 |
| 2018/0012453 | A1 | 1/2018 | Anderson | |
| 2020/0098223 | A1 | 3/2020 | Lyons et al. | |
| 2023/0017283 | A1 * | 1/2023 | Sensui | G07F 17/329 |

OTHER PUBLICATIONS

EPO Search Report, dated Oct. 18, 2022.

* cited by examiner

*Primary Examiner* — Jason T Yen
(74) *Attorney, Agent, or Firm* — Dority & Manning, P.A.

(57) ABSTRACT

A lottery ticket dispensing method provides different types of lottery tickets in a jurisdiction and includes providing first lottery tickets for sale from a dispenser for a first type of lottery game. Upon a player making a selection of one of the first lottery tickets for purchase, a controller in communication with the dispenser determines whether one or more other lottery games are available for play within the jurisdiction. The method assigns one or more companion games from the available other lottery games based on the player's selection of the first lottery ticket and predefined filter values. The companion games are presented to the player as a suggestion or recommendation for an additional lottery ticket purchase. Upon the player selecting one of the companion games for purchase, the additional lottery ticket is provided to the player from the dispenser.

14 Claims, 4 Drawing Sheets

LOTTERY TICKET DISPENSING METHOD AND SYSTEM WITH ADDITIONAL PURCHASE RECOMMENDATION CAPABILITY

BACKGROUND

Lottery tickets (e.g., "scratch-off" lottery tickets, instant-play lottery tickets, and draw-game lottery tickets) are sold at many types of retail locations including, stores, such as grocery stores, general merchandise stores, and the like. Various configurations of lottery ticket dispensers have been proposed in the industry for this purpose, including automated electronic dispensers that automatically dispense a ticket from a bin or compartment upon receipt of an electronic command signal. These dispensers may be configured as self-serve vending dispensers wholly operated by the purchaser or clerk-operated dispensers located at a point of sale in the retail establishment. These dispensers are particularly beneficial in that they have enabled a broad and varied spectrum of different lottery games to be displayed and dispensed to players from a single machine.

The concept of automatically providing a potential purchaser with recommendations for purchase of one or more additional, related products based on the purchaser's particular selected product has become a well-established commercial practice, particularly in the field of internet-based commerce. This sales practice can potentially generate significant increased sales for the vendor while being quite gratifying for the purchaser.

It would be a benefit to the lottery industry, particularly to the government-based lottery sponsors or providers who rely on lottery revenue for various civic projects and funding, to incorporate the above-defined sales practice with the sale of lottery tickets via multi-purpose automated dispensers in an efficient and reliable manner.

The present invention is directed to a system and method for dispensing lottery tickets from a dispenser, which may be an automated dispenser, with an additional purchase recommendation or suggestion to the player of one or more additional tickets that might be of interest the player.

SUMMARY

Objects and advantages of the invention will be set forth in part in the following description, or may be obvious from the description, or may be learned through practice of the invention.

In accordance with aspects of the invention, a lottery ticket dispensing method is enabled for providing different types of lottery tickets in a jurisdiction. A "jurisdiction" is understood to encompass any area or geographic region (real or virtual) in which the sale/purchase of lottery tickets has been authorized or approved by a governmental entity or other authority (e.g., at the country, state, local, municipal, or other level). In a typical scenario, the governmental entity partners with a lottery provider for providing the lottery games/tickets and associated infrastructure within the jurisdiction.

The method includes providing first lottery tickets for sale from a dispenser for a first type of lottery game. Upon a player making a selection of one of the first lottery tickets for purchase, with a controller in communication with the dispenser, the method determines whether one or more other lottery games are available for play within the jurisdiction. The method then assigns one or more companion games from the available other lottery games based on the player selection of the first lottery ticket and predefined filter values. The companion games are then presented to the player as a suggestion or recommendation for an additional lottery ticket purchase. Upon the player selecting one of the companion games for purchase, the additional lottery ticket is provided to the player from the dispenser.

In a particular embodiment of the method, the first type of lottery tickets are scratch-off lottery tickets and an inventory of the scratch-off lottery tickets for different scratch-off games are maintained in the dispenser. In this embodiment, the other lottery games may be one or more of instant-play lottery games, draw-game lottery games, and so forth. Although not limited to such games, lottery games with a depleting prize pool and limited duration are well suited as the other lottery games. With this embodiment, the additional lottery ticket associated with the other lottery game may be printed at the dispenser and provided to the player as a printed lottery ticket.

In another embodiment, the first lottery tickets may be associated with one or more of instant-play lottery games, draw-type lottery games, or depleting prize pool lottery games that are not predetermined (as with scratch-off games) but are printed or generated at the dispenser at the time a player requests such ticket. With this embodiment, the other lottery games may be scratch-off games, wherein an inventory of scratch-off lottery tickets for different ones of the scratch-off games are maintained in the dispenser.

The determination of the other lottery games that are available for play within the jurisdiction may be determined by the controller at a time of the player selection of the first type of lottery ticket. For example, the determination step may include designating a hierarchy of the companion games from the other lottery games available for play within the jurisdiction based on the filter values, wherein the assigning step is based on the hierarchy and a verification that lottery tickets are available in the jurisdiction for the companion lottery games. If the tickets are unavailable, the assigning step repeats based on the hierarchy until a desired number of the companion games is reached. In a particular example of this embodiment, the other lottery games are scratch-off games, and an inventory of scratch-off lottery tickets for different ones of the scratch-off games are maintained in the dispenser. The hierarchy may be based on scratch-off games authorized for play within the jurisdiction and the assigning step may be based on verification that scratch-off lottery tickets for the companion games are in the inventory in the dispenser. The first type of lottery games in this embodiment may be instant-play lottery games, draw-type lottery games, or others, that are printed at the dispenser.

Various configurations of a dispenser may be utilized with the present methods. In one embodiment, the dispenser is an automated self-serve dispenser operated by the player for purchase of lottery tickets or an automated dispenser operated by a clerk upon request by the player for purchase of lottery tickets. The invention also encompasses a virtual dispenser presented to the player via mobile smart device, computer, terminal, and so forth.

The predefined filter values may be one or a combination of fixed filter values based at least in part on predetermined commonalities or relationships between the different lottery games in the inventory or variable filter values that change based on external real-world situational data. In one example, when a player makes an initial lottery ticket selection for the first type of lottery game, that choice is evaluated against all of the filter values at that point in time. The other games that are available as potential companion lottery games earn "points" or credit for every filter value that applies at that moment. A decision tree implemented by the controller(s) then designates the potential companion lottery games based on a descending points order, skipping any games not having tickets available for play in the jurisdiction, until the desired number of companion lottery game recommendations can be made.

For example, for the fixed filter values, a commonality between certain of the lottery games may be a sports theme, a card-game theme, a movie theme, a music theme, and so forth. The commonality may include a certain prize structure or price of each game play (price of the lottery ticket). For example, lottery tickets having a greater prize value (and thus greater purchase price) may be assigned as companion lottery games for each other. These predefined filter values may be stored in a database that is accessed by the decision engine controller. The controller may be the dispenser controller or a central lottery controller that is in communication with the dispenser controller, or a combination of both controllers.

The variable filter values may be based on real-world conditions or events. For example, such variable filter values may relate to the time of year or seasons (e.g., a holiday season), current events, geographic location of the dispenser (e.g., local sports teams), and so forth. If used, these variable filter values may be periodically changed.

A weighting method may be used by the controller when assigning the points to the potential companion lottery games. For example, more or less consideration (points) may be given to the variable filter values as compared to the fixed filter values.

In a particular embodiment, the method may further include consideration of personal data related to the player when designating the companion lottery games, such as the player's age, hobbies, favorite sport teams, favorite movies/music/books, past history of lottery ticket purchases, or virtually any type of personal information that may influence the player's selection of a lottery game. The personal data related to the player may be stored in an electronic player profile that is accessed upon the player inputting an identification number or code (inclusive of any type of identification data) into the automated dispenser, for example via an interactive screen, display, keyboard, and the like.

The player's personal data may be used to further define or narrow the designated companion lottery games presented to the player. For example, three or four of the different lottery games may be designated as companion lottery games, wherein the personal data (if used) is used to narrow this group to one or two designated companion lottery games.

A different embodiment involves using player personal data as an initial filter value for designating the companion lottery games. Upon identification of a player, the method may include accessing stored electronic personal data of the player. With the decision controller, the personal data of the player is used as one (or the only one) of the filter values to designate one or more companion lottery games from the different lottery games in the inventory. As with the other embodiments, the method verifies that the designated companion lottery games have lottery tickets available in the inventory. Then, one or more of the verified designated companion lottery games is assigned to the player's initial ticket choice and presented to the player as a suggestion for an additional lottery ticket purchase. The player can add the additional purchase to the purchase process used for their initial ticket selection, which is process by the dispenser controller.

The player's personal data may be the only filter value or a heavily weighted filter value. The method may further include inputting additional predefined filter values into the determination of the designated companion lottery games presented to the player, wherein the predefined filter values are one or a combination of fixed filter values based on predetermined commonalities between the different lottery games in the inventory or variable filter values based on real-world external situational data, as discussed above.

The present invention also encompasses a lottery ticket dispensing system configured for execution of the method embodiments discussed above.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The method embodiments in accordance with the invention are drawn to dispensing lottery tickets via a dispenser. As explained below, the methods are not limited to the type of lottery tickets. For example, the lottery tickets may be related to draw-type or instant-play lottery games that are printed "on demand" at the dispenser. The lottery tickets may be pre-printed scratch-off lottery tickets, wherein an inventory of such tickets are loaded into the dispenser.

The methods are not limited by the type of dispenser, and a number of known conventional dispensers may be configured for practice of the methods. For purposes of explaining aspects of the invention, exemplary automated dispensers are depicted with reference to FIGS. 1-3.

Figure 1:
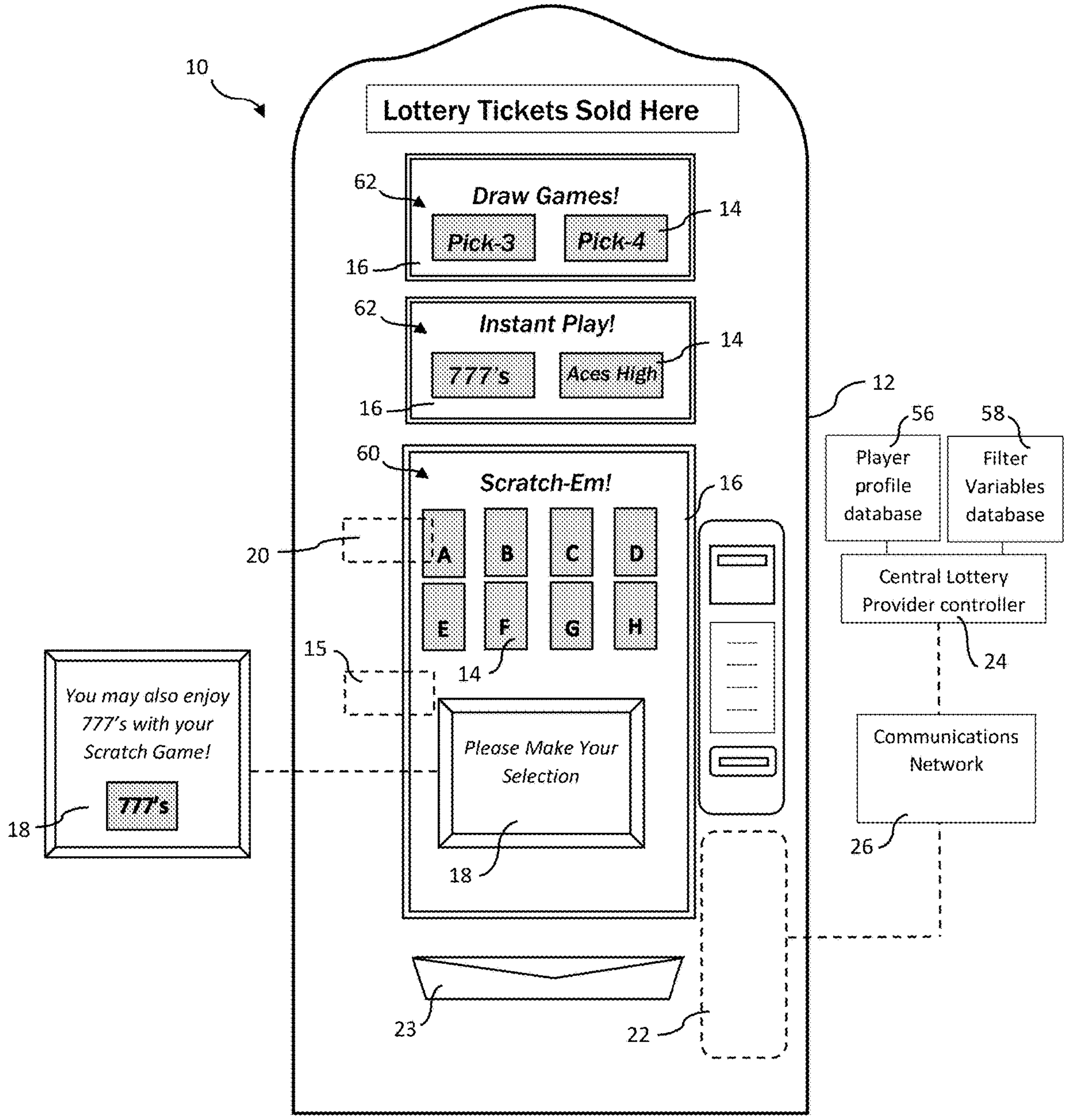
FIG. 1 is a view of an example of an automated lottery ticket dispenser configured for practice of the methods described herein.

FIG. 1 depicts and automated lottery ticket dispenser 10 in the form of a self-serve vending machine wherein potential players can initiate and complete a purchase transaction for one or more lottery tickets 14 related to the same or different types of lottery games. For example, the dispenser

10 may contain an inventory of scratch-off lottery tickets for different scratch-off lotter games. The dispenser 10 may also be configured with an internal printer 15 in order to print on-demand lottery tickets, for example for draw-type or instant-pick type lottery games. The dispenser 10 includes a cabinet 12 that houses a plurality of ticket dispensing bins 20 (described in greater detail below). The cabinet 12 may include one or more front electronic display panels 16 that present pictures or other representations of the lottery tickets 14 that are available for purchase. Alternatively, the panel may comprise a window that permits viewing of the dispensing bins 20, wherein each bin 20 displays an actual lottery ticket 14.

The dispenser 10 may include an interactive screen 18 or other device (e.g., keyboard) configured to allow the player to make a selection of a ticket 14 for purchase and complete other aspects of the purchase process. Upon completion of the transaction, the bin(s) 20 or printer 15 automatically dispense the purchased lottery tickets, which drop into the tray 23 for retrieval by the player.

The dispenser 10 includes a local controller 22, which may be internal to the cabinet 12. The controller 22 is configured to carry out certain of the dispenser-related processes described herein. The controller 22 may be configured in communication with a remote central lottery controller/server 24 via a suitable communications network 26.

Figure 2:
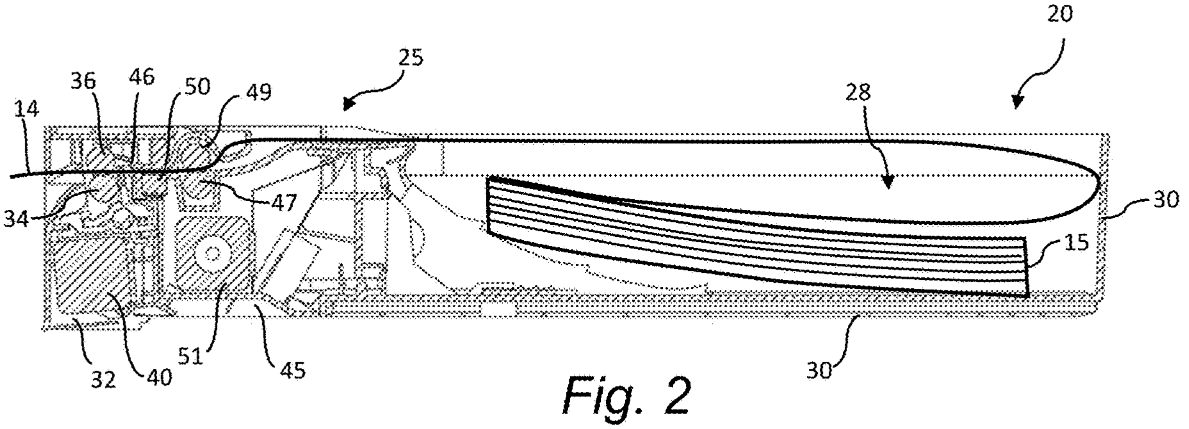
FIG. 2 is a side cut-away view of an exemplary dispensing bin for use in an automated lottery ticket dispenser.

FIG. 2 depicts an embodiment of a bin 20 that may be used in the dispenser 10 for dispensing scratch-off lottery tickets. A plurality of such bins 20 may be configured in a stacked arrangement within a frame within the cabinet 12, wherein each bin 20 contains a stack 15 of scratch-off lottery tickets 14. Each of the bins 20 includes a controller that is in communication with the dispenser controller 22 for dispensing the lottery tickets 14 purchased by the player.

Referring still to FIG. 2, the bin 20 includes one or more ticket compartments 28 formed by bottom and side walls 30. The ticket compartment 28 may have an open top for easier insertion of the lottery tickets 14 therein. The lottery tickets 14 (e.g., scratch-off lottery tickets) are provided in a roll or fan-folded stack 15 and are connected in an end-to-end strip at a separation line, such as a perforation line, between adjacent tickets. Each lottery ticket 14 in the stack 15 typically includes a machine-readable code printed on a front or back side thereof, such as an alpha-numeric code, bar code, QR code, or the like. The type of code may vary depending on the desired information content of the code, space on the ticket 14, and so forth. The use of such codes on lottery tickets 14 for various functions related to inventory, identification, verification, and security are well-known.

In the illustrated embodiment, bin 20 includes an automated dispensing mechanism 25, which may be variously configured. For example, the dispensing mechanism 25 may include a separation module 32 through which the continuous strip of lottery tickets 14 from the ticket compartment 28 is threaded and a leading lottery ticket 14 is separated and dispensed from the bin 20. The separation module 32 may be integral (i.e., single piece construction) with the other components of the bin 20. Alternatively, the separation module 32 is detachably connected to the bin 20 via a feed module 45 (described in greater detail below). With this configuration, the separation module 32 can be removed for maintenance or replaced without having to pull the entire bin 20 from its frame.

The separation module 32 may include a drive roller 34 and opposed idler roller 36, wherein a nip is defined between the rollers 34, 36 through which the strip of lottery tickets 14 is conveyed, as seen in FIG. 2. A first motor 40 drives the drive roller 34, for example via a gear arrangement or other suitable drive means. The motor 40 is controlled by a bin controller (not depicted), which may be provided on a circuit board within the separation module 32. Via the controller, the motor 40 is switchable between a convey mode wherein the drive roller 34 engages and conveys the leading lottery ticket 14 through the nip to a separation position (discussed below) and a brake mode wherein the motor 40 provides a reverse retarding force to the drive roller 34 thereby braking the drive roller 34 against an attempted reeling of the lottery tickets 14 from the dispensing unit 10. This retarding force does not cause the drive roller 34 to reverse direction and draw the lead ticket 14 back into to separation module 32 but is sufficient to generate a “holding effect” at the roller nip on the adjacent lottery ticket 14 to prevent reeling of the continuous strip of tickets by a person grasping the leading ticket 14 extending from a dispensing slot and attempting to pull additional tickets 14 from the bin 20.

The separation module 32 includes an automatic separator device 46 upstream of the drive roller 34 in a conveying direction of the lottery tickets 14 that separates the leading lottery ticket 14 from its adjacent lottery ticket. The drive roller 34 is driven to convey the leading ticket 14 to the separation position such that a line (e.g., a perforation line) between the leading ticket 14 and an adjacent ticket 14 is upstream of the drive roller 34 at a location where it is acted on by the separator device 46. An embodiment of a suitable separator device 46 is described, for example, in co-pending U.S. application Ser. No. 17/020,080 filed Oct. 14, 2020. The ’080 application is incorporated herein by reference in its entirety for all purposes.

The dispensing bin 20 may include a feed module 45 operationally configured between the separation module 32 and the ticket compartment(s) 28. The feed module 45 includes a feed roller 47 and opposed idler roller 49 with a nip therebetween. The feed roller 47 is driven by a feed motor 52 (e.g., via gears) to engage and convey the continuous strip of lottery tickets 14 from the ticket compartment 28 to the separation module 32. In the embodiment depicted in the figures, the separation module 32 is detachably connected to the feed module 45.

An optical scanner 50 is disposed below or above the path of the lottery tickets 14 through the feed module 45 or separation module 32 to detect the mark on the tickets 14. The scanner 50 may be any conventional reader, such as a point scanner, linear scanner, laser scanner, LED image scanner, and so forth. The mark may be a barcode or Q-code printed on the back of each lottery ticket 14. The scanner 50 is in communication with the dispenser controller 22 via the bin’s controller for various purposes, for example to control the run time of the feed motor 51 based on detection of the separation line between the leading ticket 14 and the adjacent ticket.

For purposes of the present method, by reading the marks on the individual lottery tickets 14 as they are sequentially dispensed from the bin 20 in a dispense sequence, the scanner 50 enables the controller(s) 22, 24 to keep a continuous inventory of the lottery tickets 14 remaining in the bin 20. The stack 15 of lottery tickets 14 initially loaded into the bin 20 contains a defined number of lottery tickets 14. This number is entered automatically or manually into the controller 22 (or may be provided to the controller 22 from the central lottery controller 24). The controller 22 subtracts the number of dispense sequences detected by the scanner 50 from the total number of tickets in the initial stack 15 to maintain an accurate inventory of the remaining lottery tickets 14 in the bin 20.

Figure 3:
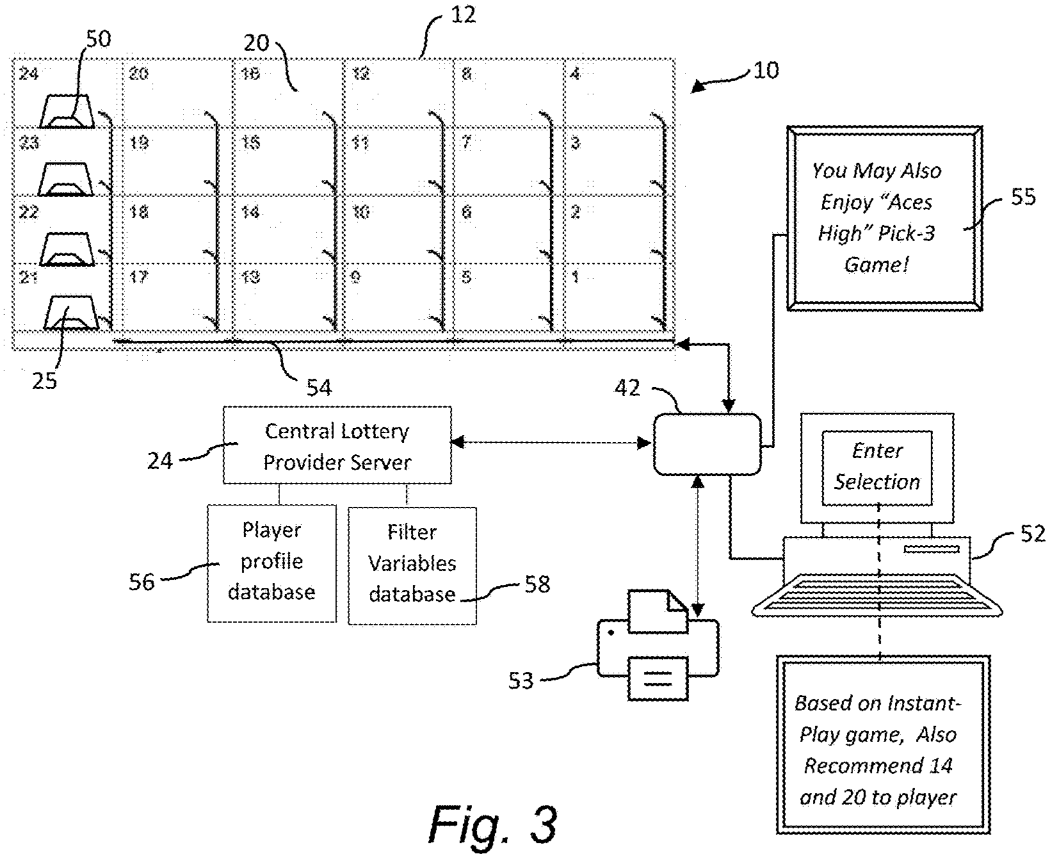
FIG. 3 is a view of an alternative automated lottery ticket dispenser configured for practice of the methods described herein.

FIG. 3 depicts an embodiment of an automated dispenser 10 configured for operation by a clerk in a retail establishment. Such dispensers 10 are typically located at a point of sale (POS) within the establishment and are configured with a dedicated terminal 52, which is in communication with the dispenser controller 42 (internal or external to the cabinet 12). The clerk enters a purchase request via the terminal 52 that is processed by the controller 42, which transmits a dispense command to one or more of the bins 20. Each of the bins 20 is configured with a dispensing mechanism 25 and scanner 50. Various operational aspects of the disperser 10 in FIG. 3 are as described above with respect to the dispenser of FIG. 2.

The terminal 52 may be in communication with an electron display 55 located at or near the POS that advertises or displays the various lottery tickets available for purchase at the retail location. As depicted in FIG. 3, this display 53 may be used to provide a recommendation to the player for purchase of one or more lottery game tickets related to a lottery game other than the game selected by the player for purchase, as described below.

The terminal 52 may also be in communication with a printer 53 for printing on-demand lottery tickets for particular types of lottery games, such as draw-games, instant-pick games, or depleting pool games requested by the player or suggested to the player for additional purchase, as explained in greater detail below.

Figure 4:
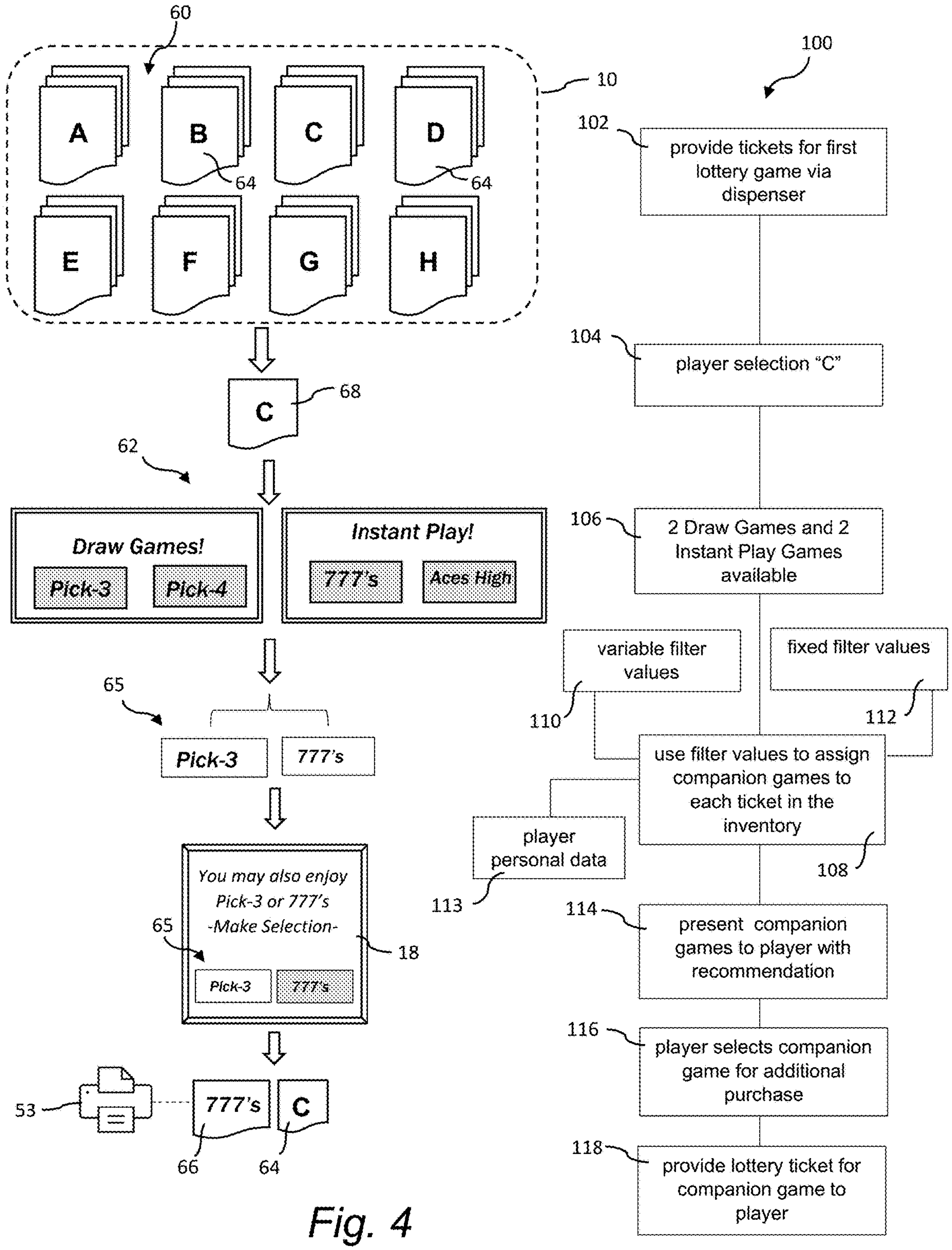
FIG. 4 depicts a method for dispensing lottery tickets in accordance with aspects of the present invention.

With reference to FIG. 4, an exemplary lottery ticket dispensing method 100 in accordance with the invention is depicted. At 102, the method includes providing first lottery game tickets 64 for a first lottery game 60 offered for sale from the dispenser 10. For example, the first lottery game 60 may be a scratch-game wherein a plurality of different scratch-games 60 (e.g., games A through H) are authorized for play in the jurisdiction and offered via the dispenser 10. Each of the scratch games 60 may have a different game theme (e.g., sports, music, etc.), rules of play, prize structure, and the like.

At step 104, the player makes a selection 68 for purchase of one of the first lottery tickets 64 for the first lottery game 60. It is appreciated that the player may select to purchase tickets 64 for any number or combination of the scratch-games A-H. For example, in the depicted embodiment, the player selection 68 is for a ticket 64 for the scratch-game "C."

At step 106, the determination is made of other lottery games 62 that are available for play in the jurisdiction. In the depicted embodiment, the determination is made that two draw-games (Pick-3 and Pick-4) and two instant-play games (777's and Aces High) are available. This step may be performed by the dispenser controller 22 or the central lottery controller 24, or a combination of the two controllers 22, 24, and may be done at the time the player makes their selection or prior to the player making their selection. For example, the determination may be made according to a defined schedule (e.g., once per day) and stored in the controller(s) 22, 24.

The other lottery games 64 are understood to be lottery games having a different prize pool and game format. For example, scratch-games have a predetermined outcome (game format) and prize pool assigned to each specific game. On the other hand, the outcome of a draw-game is determined by a future random draw event and the outcome of an instant-play game is randomly determined at the time of printing the ticket. Draw-games, instant-play games, and depleting prize pool games typically have a defined duration and a prize pool that may vary (e.g., grow or decrease) over time.

At step 108, the controller(s) 22, 24 assign one or more companion games 65 from the available other lottery games 62 based on the player selection 68 of the first lottery ticket 64 and predefined filter values 110, 112 (explained in greater detail below).

At step 114, the companion game(s) 65 are presented to the player along with a recommendation or suggestion to purchase a lottery game ticket 66 from the companion game 65 along with their purchase of the first lottery game ticket 64 corresponding to their selection 68. This recommendation may be made, for example, via the display 18 on the dispenser 10 or verbally by a clerk manning the terminal 52, as depicted in FIG. 3.

At step 116, the player selects to purchase one or more of the lottery game tickets 66 corresponding to the recommended companion lottery games 65. This may be accomplished by providing the player with a selection option via the display 18 on the dispenser, as depicted in FIG. 4, or by the retail clerk taking the player's verbal request and entering it via the terminal 52 (FIG. 3).

At step 118, the additional lottery game ticket(s) 66 corresponding to the companion game 65 selected by the player and the lottery game ticket(s) 64 corresponding to the player selection 68 of the first lottery game 60 are provided to the player, for example by being printed (if a draw-game, instant-play game, or depleting pool game) at the dispenser 10 or dispensed from the inventory (if a scratch-game ticket) maintained in the dispenser 10.

Referring to steps 108-112 in FIG. 4, the assignment of companion games 65 based on the player selection 68 and filter values may be performed by the dispenser controller 22 or the central lottery controller 24, or a combination of the two controllers 22, 24, functioning as decision engines. The order of selection of the companion games 65 may be based on a hierarchy of points or credits assigned to the other lottery games 62 available in the jurisdiction on the filter values. For example, when the player makes their initial lottery ticket selection 68 from the first lottery games 60, that selection is evaluated against all of the filter values at that point in time. The other games 62 that are available as potential companion lottery games earn "points" or credit for every filter value that applies at that moment. A decision tree implemented by the controller(s) 22, 24 then designates the potential companion lottery games 62 based on a descending points order, skipping any games 62 not having tickets in inventory in the dispenser 10 or otherwise not available, until the desired number of companion lottery games 65 can be assigned. For example, although certain draw-games and/or instant-play games are authorized in the jurisdiction, it may be that at the time of the player's selection 68, tickets for such draw-games and/or instant-play games cannot be provided because the prize pool has been depleted or a game has timed out, and so forth.

The predefined filter values used by the controller(s) 22, 24 may be one or a combination of fixed filter values 112 that are based at least in part on predetermined commonalities or relationships between the different lottery games 60, 62 or variable filter values 110 that change based on external real-world situational data.

For example, for the fixed filter values 112, the first lottery games 60 and other lottery games 62 may have a common or related theme, such as a sports theme, a card-game theme, a movie theme, a music theme, and so forth. In other embodiments, the commonality may include a certain prize structure or price of each game play. For example, first lottery games 60 having a greater prize value (and thus greater purchase price) may be assigned other lottery games 62 having a similar price or prize value as companion lottery games 65.

The variable filter values 110 may be based on real-world conditions or events. For example, such variable filter values 110 may related to the time of year or seasons (e.g., a holiday season), current events, geographic location of the dispenser (e.g., local sports teams), and so forth. If used, these variable filter values 104 may be periodically changed. A weighting method may be used by the controller(s) 22, 24 when assigning the companion lottery games 65 wherein more or less consideration is given to the variable filter values 110 as compared to the fixed filter values 112.

The filter values 110, 112 may be stored in an electronic database 58 (FIGS. 1 and 3) that is accessed by the controller(s) 22, 24 and then used generate the assignments of the respective companion lottery games 65. The filter values 110, 112 are essentially factors used by the controller(s) 22, 24 to group certain of the games 60, 65 together based on a commonality or relationship shared by the games (the fixed filter values) or related to an external real-world variable (the variable values).

Still referring the FIGS. 3 and 4, in a particular embodiment, the method 100 may further include at step 113 inputting personal data related to the player as a type of variable filter value when designating the companion lottery games 65. This personal data may include, for example, the player's age, biometric information hobbies, favorite sport teams, favorite movies/music/books, history of past ticket purchases, or virtually any type of personal information that may influence the player's selection of a lottery game. The personal data related to the player may be stored in an electronic player profile 56 (FIG. 3) that is accessed upon the player inputting an identification number, password, or code (inclusive of any type of identification data) into the automated dispenser 10, for example via an interactive screen, display, keyboard, and the like.

The player's personal data may be used to further define or narrow the companion lottery games 65 presented to the player. For example, in FIG. 4, four other lottery games 62 are identified as available for play in the jurisdiction. The player personal data used in step 113 may be the only filter value or may be more heavily weighted as compared to the other filter values 110, 112.

Figure 5:
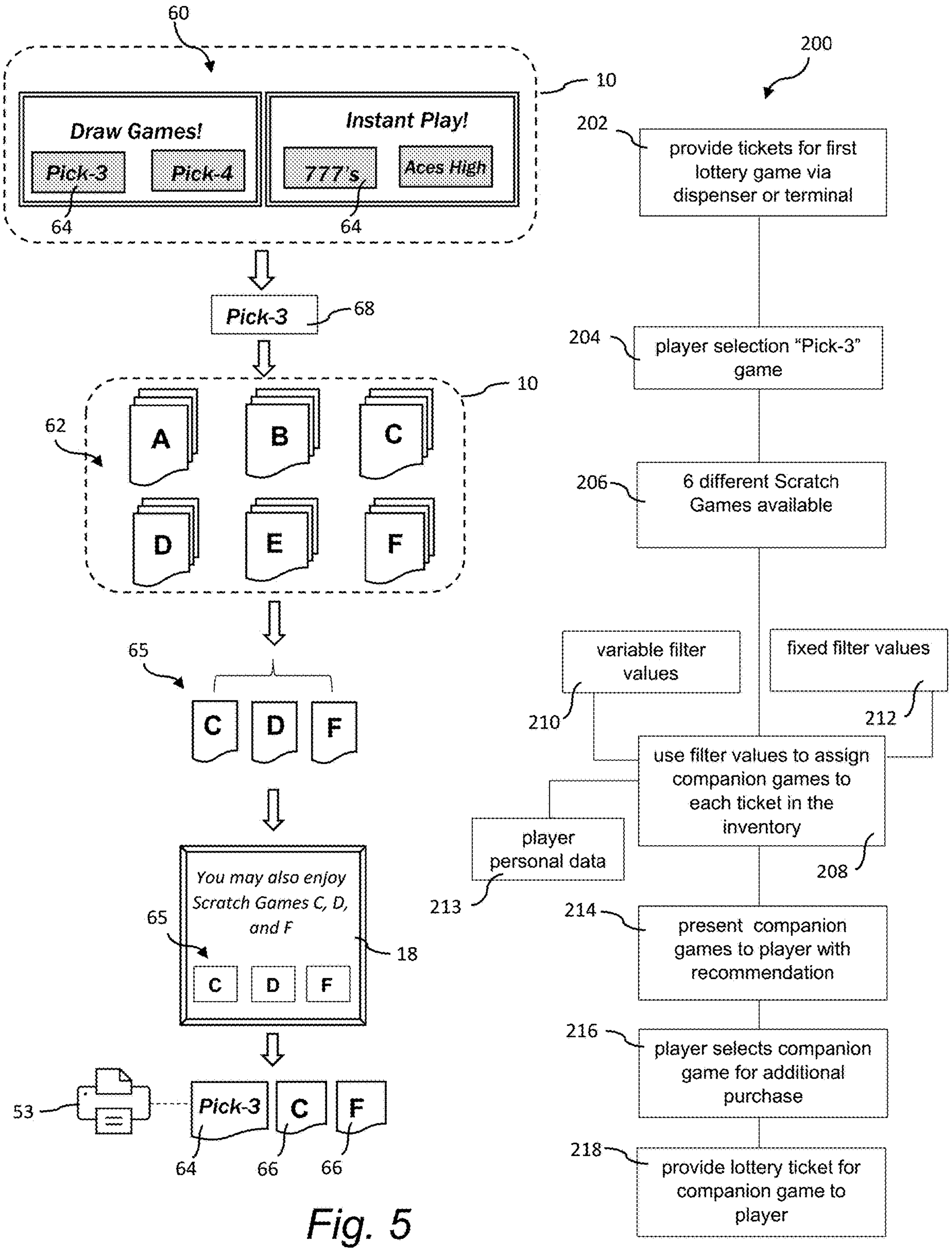
FIG. 5 depicts an alternative method for dispensing lottery tickets in accordance with aspects of the present invention.

FIG. 5 depicts and embodiment of the method 200 that is similar to FIG. 4 except that the first lottery games 60 presented to the player are draw-games, instant-play games, or depleting pool games. First lottery game tickets 64 for these games may be provided to the player at step 202 via the automated dispenser 10 or via a terminal 52 and associated printed 53 (FIG. 2).

At step 204, the player makes a selection 68 for purchase of one of the first lottery tickets 64 for the first lottery game 60. It is appreciated that the player may select to purchase tickets 64 for any number or combination of the first lottery games 60. In the depicted embodiment, the player selection 68 is for a ticket 64 for the Pick-3 draw game.

At step 206, the determination is made of other lottery games 62 that are available for play in the jurisdiction. In the depicted embodiment, the determination is made that six scratch-games A-F are available. This step may be performed by the dispenser controller 22 or the central lottery controller 24, or a combination of the two controllers 22, 24, and may be done at the time the player makes their selection or prior to the player making their selection. For example, the determination may be made according to a defined schedule (e.g., once per day) and stored in the controller(s) 22, 24.

The other lottery games 62 are understood to be lottery games having a different prize pool and game format. For example, the scratch-games A-F have a predetermined outcome (game format) and prize pool assigned to each specific game. On the other hand, the outcome of the Pick-3 draw-game is determined by a future random draw event.

At step 208, the controller(s) 22, 24 assign one or more companion games 65 from the available other lottery games 62 based on the player selection 68 of the first lottery ticket 64 and predefined filter values 110, 112.

At step 214, the companion game(s) 65 are presented to the player along with a recommendation or suggestion to purchase a lottery game ticket 66 from the companion game(s) 65 along with their purchase of the first lottery game ticket 64 corresponding to their selection 68. This recommendation may be made, for example, via the display 18 on the dispenser 10 or verbally by a clerk manning the terminal 52, as depicted in FIG. 3.

At step 216, the player selects to purchase one or more of the lottery game tickets 66 corresponding to the recommended companion lottery games 65. This may be accomplished by providing the player with a selection option via the display 18 on the dispenser, as depicted in FIG. 5, or by the retail clerk taking the player's verbal request and entering it via the terminal 52 (FIG. 3).

At step 128, the additional lottery game ticket(s) 66 corresponding to the companion game 65 selected by the player and the lottery game ticket(s) 64 corresponding to the player selection 68 of the first lottery game 60 are provided to the player, for example by being printed (if a draw-game, instant-play game, or depleting pool game) at the dispenser 10 or dispensed from the inventory (if a scratch-game ticket) maintained in the dispenser 10.

The present invention also encompasses a lottery ticket dispensing system configured for execution of the method embodiments discussed above. Embodiments of such system are depicted in the figures and described above.

The embodiments particularly shown and described above are not meant to be limiting, but instead serve to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A lottery ticket dispensing method for providing different types of lottery tickets in a jurisdiction, comprising:

providing first lottery tickets for sale from a dispenser for a first type of lottery game;

upon a player making a selection of one of the first lottery tickets for purchase, with a controller in communication with the dispenser, determining whether one or more other lottery games are available for play within the jurisdiction;

assigning one or more companion games from the available other lottery games based on the player's selection of the first lottery ticket and predefined filter values;

presenting the companion games to the player as a suggestion or recommendation for an additional lottery ticket purchase;

upon the player selecting one of the companion games for purchase, providing the additional lottery ticket to the player from the dispenser;

wherein the determination of the other lottery games available for play within the jurisdiction is determined by the controller at a time of the player selection of the first type of lottery ticket; and wherein the determination step comprises designating a hierarchy of the companion games from the other lottery games authorized for play within the jurisdiction based on the filter values, the assigning step based on the hierarchy and a verification that lottery tickets are available in the jurisdiction for the companion lottery games, wherein the assigning step repeats based on the hierarchy until a desired number of the companion games is reached.

2. The lottery ticket dispensing method as in claim 1, wherein the first type of lottery game are scratch-games and an inventory of scratch-off lottery tickets for different scratch-off games are maintained in the dispenser.

3. The lottery ticket dispensing method as in claim 2, wherein the other lottery games are one or more of instant-play games, draw-games, or depleting prize pool games having a defined duration.

4. The lottery ticket dispensing method as in claim 3, wherein the additional lottery ticket is printed at the dispenser and provided to the player as a printed lottery ticket.

5. The lottery ticket dispensing method as in claim 1, wherein the first type of lottery game are one or more of instant-play games, draw-games, or depleting prize pool games having a defined duration and the first lottery tickets associated therewith are printed at the dispenser.

6. The lottery ticket dispensing method as in claim 5, wherein the other lottery games are scratch-off games, and an inventory of scratch-off lottery tickets for different ones of the scratch-off games are maintained in the dispenser.

7. The lottery ticket dispensing method as in claim 1, wherein the other lottery games are scratch-off games, and an inventory of scratch-off lottery tickets for different ones of the scratch-off games are maintained in the dispenser, the hierarchy based on the scratch-off games authorized for play within the jurisdiction and the assigning step based on verification that scratch-off lottery tickets for the companion games are in the inventory in the dispenser.

8. The lottery ticket dispensing method as in claim 1, wherein the other lottery games are one or more of instant-play games, draw-games, or depleting prize pool games having a defined duration that are printed at the dispenser, the hierarchy based on the other lottery games authorized for play within the jurisdiction and the assigning step based on verification that lottery tickets for the companion games are available in the jurisdiction.

9. The lottery ticket dispensing method as in claim 1, wherein the dispenser is an automated self-serve dispenser operated by the player for purchase of lottery tickets or an automated dispenser operated by a clerk upon request by the player for purchase of lottery tickets.

10. A lottery ticket dispensing method for providing different types of lottery tickets in a jurisdiction, comprising:

providing first lottery tickets for sale from a dispenser for a first type of lottery game;

upon a player making a selection of one of the first lottery tickets for purchase, with a controller in communication with the dispenser, determining whether one or more other lottery games are available for play within the jurisdiction;

assigning one or more companion games from the available other lottery games based on the player's selection of the first lottery ticket and predefined filter values;

presenting the companion (lames to the player as a suggestion or recommendation for an additional lottery ticket purchase;

upon the player selecting one of the companion games for purchase, providing the additional lottery ticket to the player from the dispenser; and wherein the predefined filter values are one or a combination of fixed filter values based on predetermined commonalities between the player selection of the first lottery ticket and the other lottery games available in the jurisdiction or variable filter values based on external situational data.

11. The lottery ticket dispensing method as in claim 10, wherein the predefined filter values are stored in a database that is accessed upon the player selection of the first lottery ticket.

12. The lottery ticket dispensing method as in claim 11, wherein the predefined filter values are periodically changed.

13. The lottery ticket dispensing method as in claim 10, wherein the variable filter values comprise personal data related to the player.

14. The lottery ticket dispensing method as in claim 13, wherein the personal data is stored in a remote electronic player profile database that is accessed upon the player inputting an identification number or code into the dispenser.

* * * * *